United States Patent
Spire, Jr.

(10) Patent No.: US 7,685,722 B1
(45) Date of Patent: Mar. 30, 2010

(54) COMPACT CELESTIAL NAVIGATION DEVICE

(76) Inventor: Garold Dean Spire, Jr., P.O. Box 315, Lame Deer, MT (US) 59043

(*) Notice: Subject to any disclaimer, the term of this patent is extended or adjusted under 35 U.S.C. 154(b) by 53 days.

(21) Appl. No.: 12/196,555

(22) Filed: Aug. 22, 2008

(51) Int. Cl.
*G01C 17/34* (2006.01)
*G01C 21/00* (2006.01)
*G01C 9/10* (2006.01)

(52) U.S. Cl. ............... 33/270; 33/354; 33/365; 33/391

(58) Field of Classification Search ............ 33/268, 33/269, 270, 271, 354, 365, 391
See application file for complete search history.

(56) References Cited

U.S. PATENT DOCUMENTS

| | | | |
|---|---|---|---|
| 89,585 A | 5/1869 | Johnson | |
| 205,485 A | 7/1878 | Holmes | |
| 254,733 A | 3/1882 | Valentine | |
| 1,361,367 A * | 12/1920 | Coxey | 33/365 |
| 1,570,349 A | 1/1926 | Hollinwood | |
| 1,610,533 A * | 12/1926 | Pozzi | 33/270 |
| 2,072,565 A * | 3/1937 | Moehle | 33/270 |
| 2,531,932 A | 11/1950 | Brown | |
| 2,567,139 A | 9/1951 | Wenz | |
| 2,582,179 A | 1/1952 | Thomson | |
| 2,637,108 A | 5/1953 | Viesturs | |
| 3,673,696 A * | 7/1972 | Wasson | 33/370 |
| 3,673,697 A * | 7/1972 | Wasson | 33/348 |
| 3,858,334 A | 1/1975 | Eisenhauer | |
| 3,947,973 A | 4/1976 | Dunn | |
| 4,012,851 A | 3/1977 | Eisenhauer | |
| 4,028,813 A | 6/1977 | Eldridge | |
| 4,083,121 A | 4/1978 | Eisenhauer | |
| 4,103,429 A | 8/1978 | Wagoner | |
| 4,104,722 A | 8/1978 | Evans | |
| D254,733 S | 4/1980 | Faulkner | |
| 4,208,805 A | 6/1980 | McEwen | |
| 4,333,243 A | 6/1982 | McLaughlin | |
| 4,479,800 A * | 10/1984 | Chester | 33/365 |
| 4,512,085 A | 4/1985 | Liddell | |
| 4,520,572 A | 6/1985 | Spilhaus | |

(Continued)

OTHER PUBLICATIONS

Prices4Antiques.com, web page, saved Aug. 21, 2008.

*Primary Examiner*—G. Bradley Bennett
(74) *Attorney, Agent, or Firm*—James Richards

(57) ABSTRACT

A celestial navigation device. A full-featured embodiment is useful as a sundial and planisphere and for measuring, among other things, latitude, longitude, and for time to angle conversions. The device may have one or more rings and is based on a transparent circular tube having a gravity indicator, typically a ball or bubble, in the circular tube, which locates the lowest or highest point in the tube to indicate time or angle measurements against a corresponding scale. The device may have a 24-hour time scale, a calendar scale, and/or an angle scale. One embodiment includes a split analemma with separate north and south portions. Each analemma portion is used with a corresponding gnomon of a pair of gnomons, each on opposite sides of the tubular ring. A two-ring embodiment has an inner ring and outer ring rotatably slidable relative to one another. Two additional gnomons and star position marks may be provided for star sighting observations. The device has a hollow center and may be worn as a bracelet and may be constructed with precious metals and/or gems to enhance the value of the bracelet aspect.

20 Claims, 5 Drawing Sheets

U.S. PATENT DOCUMENTS

| | | |
|---|---|---|
| 4,645,354 A | 2/1987 | Mercer |
| 4,656,748 A | 4/1987 | Thual |
| 4,711,583 A | 12/1987 | Oechslin et al. |
| 5,157,842 A * | 10/1992 | Swanda ................. 33/365 |
| 5,186,630 A | 2/1993 | Tien |
| 5,197,199 A | 3/1993 | Schrader |
| 5,425,178 A | 6/1995 | Steele |
| 5,450,674 A | 9/1995 | Jen-Hu |
| 6,018,503 A | 1/2000 | Pfister et al. |
| 6,272,075 B1 | 8/2001 | Paganelli et al. |
| 6,301,795 B1 * | 10/2001 | Kang ..................... 33/365 |
| 6,449,219 B1 | 9/2002 | Hepp et al. |
| 6,449,854 B1 | 9/2002 | Cheung |
| 6,523,270 B1 | 2/2003 | Cheung |
| 6,604,290 B1 | 8/2003 | Hughes, Jr. |
| 6,744,695 B2 | 6/2004 | Goldberg |
| 6,947,351 B1 | 9/2005 | Loth et al. |
| 7,114,262 B2 | 10/2006 | Andrews |

* cited by examiner

COMPACT CELESTIAL NAVIGATION DEVICE

FIELD OF THE INVENTION

The present invention pertains generally to the field of geometrical instruments, more particularly to the field of celestial instruments having a gnomonic indicator.

BACKGROUND

School children are taught about how the earth is round and orbits around the sun and about the earth's declination on the orbit and how this results in the four seasons. Yet when one goes outside, the earth looks flat and the sun is somewhere in the sky, and it is difficult to fully grasp or appreciate the geometry involved. In addition, modern air travel has greatly shortened the time and effort required to travel great distances around the globe. One crosses multiple time zones, experiences jet lag and may experience different climates or reversal of the seasons upon travel to the opposite hemisphere. Yet the geometry behind this can remain somewhat obscure and theoretical.

Thus, there is a need for a portable device that can be easily carried on trips to enhance the appreciation of the concepts of latitude and longitude, and timekeeping and how these concepts relate to the daily and annual movements of the sun and the stars.

BRIEF DESCRIPTION OF THE INVENTION

Briefly, the present invention relates to a celestial navigation device. A full-featured embodiment is useful as a sundial and planisphere and for measuring, among other things, latitude, longitude, and for time to angle conversions. The device may have one or more rings and is based on a transparent circular tube having a gravity indicator, typically a ball or bubble, in the circular tube, which locates the lowest or highest point in the tube to indicate time or angle measurements against a corresponding scale. The device may have a 24-hour time scale, a calendar scale, and/or an angle scale. One embodiment includes a split analemma with separate north and south portions. Each analemma portion is used with a corresponding gnomon of a pair of gnomons, each on opposite sides of the tubular ring. A two-ring embodiment has an inner ring and outer ring rotatably slidable relative to one another. Two additional gnomons and star position marks may be provided for star sighting observations. The device has a hollow center and may be worn as a bracelet and may be constructed with precious metals and/or gems to enhance the value of the bracelet aspect.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements.

Additionally, the left-most digit(s) of a reference number identifies the drawing in which the reference number first appears.

DETAILED DESCRIPTION OF THE INVENTION

The present invention relates to an ornamental bangle which allows the bearer to estimate his/her longitude and latitude from the sun and stars.

One exemplary embodiment comprises a bangle comprised of approximately one centimeter diameter transparent tubular material formed into a ring of approximately 7 cm inside diameter and sheathed on the inside to form an additional ring of half cylinder cross section which may slide in relation to the first mentioned ring. The former containing either a small sphere which can roll within the lumen of the first ring or be filled with liquid excepting a small bubble of air either of which will act as the indicator. The sheath modified to accept a 13 mm×32 mm ticket on its inner surface perpendicular to the plane of the rings on the surfaces of which is printed an analemma. The inner ring forming the sheath having the numerals of a 24 hour clock printed on its lateral surfaces and a directional inscription on the inner surface. The outer tubular ring on its outer half having the degrees of longitude printed on one lateral surface and the days of the year on the remaining lateral surface. The hours, degrees, and days aligning to form an analog slide rule for calculating time vs. longitude and the opposite surface a planisphere for calculating the ecliptic. The inner surface of the inner ring having printed on its concave surface (visible through the transparent outer ring) the longitude and latitude of forty major cities, i.e., an alpha numeric map of the earth. The inner ring having four gnomons, one each of a first pair on opposite sides of the ring at the 12 midnight position and one each of a second pair on opposite sides at a 12 o'clock noon position.

The inner ring is aligned with its axis north and south and its gnomon's solar shadow positioned to fall on the analemma giving thus by the indicator solar time. Held with its axis in an east west direction at noon and setting the declination indicated on the analemma for the day in question to the noon gnomon the bracelet indicates latitude when the sun's shadow is cast on the mean solar time line of the analemma.

The outer ring is marked with two luminescent dots on either face which represent specific stars and when aligned as a planisphere with the day's date on the 12 noon gnomon the bracelet will indicate solar time at night. The gnomon when aligned with the 90 degree marks on the outer ring and then aligned with the North Star gives declination and therefore latitude at night. Solar time day or night is converted to longitude with the analog slide rule by first setting the zero degree mark at Mean Greenwich time and reading longitude at solar time.

The present invention will now be described in detail with reference to the figures.

Figure 1:
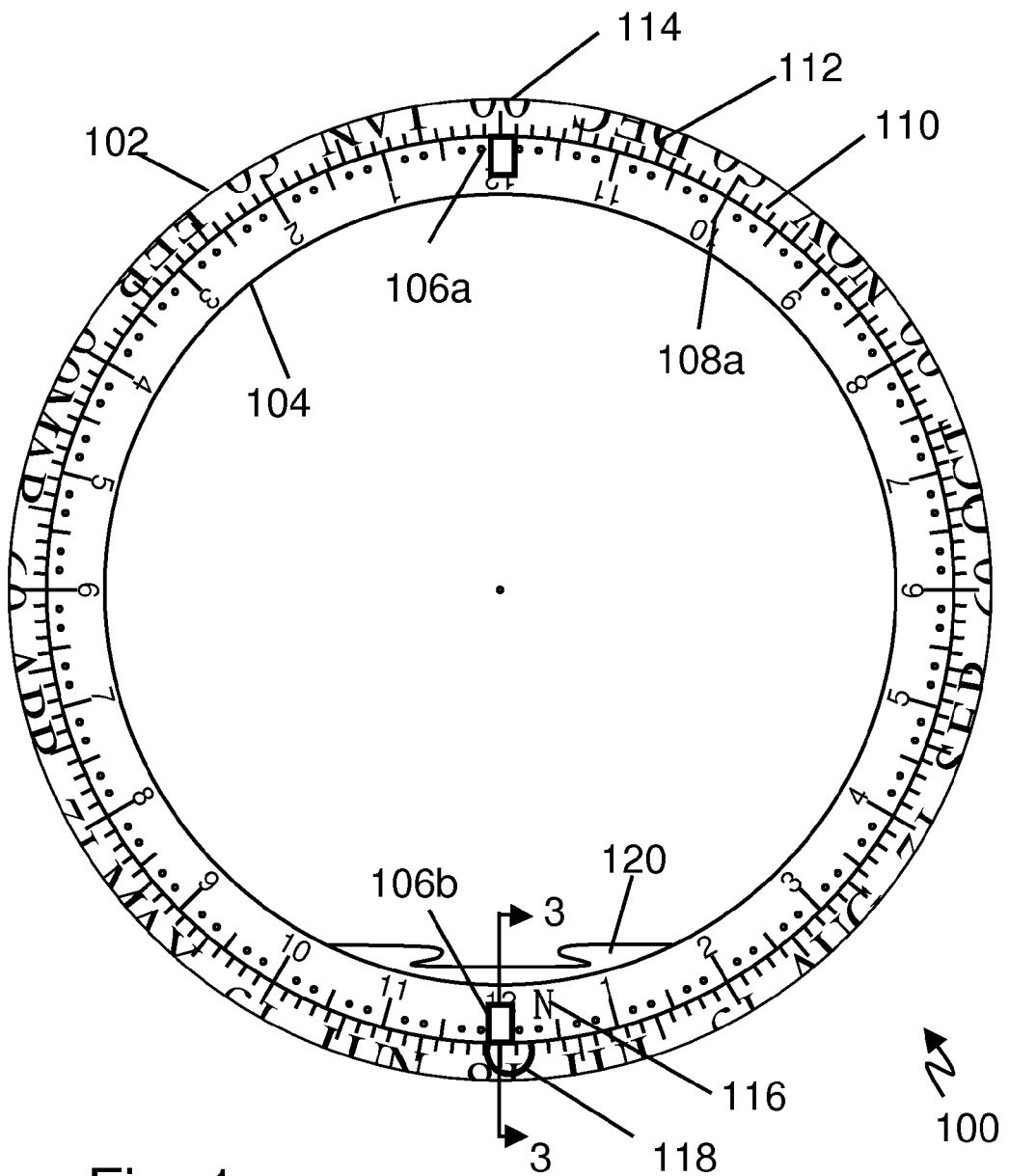
FIG. 1 illustrates a top view of an exemplary sundial in accordance with the present invention, showing the north face with an hour scale on the inner ring and an angle scale on the outer ring.

FIG. 1 illustrates a top view of an exemplary sundial in accordance with the present invention, showing the north face with an hour scale on the inner ring and an angle scale on the outer ring. Referring to FIG. 1, the sundial comprises two rings, an inner ring 104 and an outer ring 102 that may slidably rotate relative to one another. The inner ring 104 is shown with an hour scale 108a for time measurements and settings. The inner ring 104 also includes two gnomons 106a and 106b as shown on the top and two more directly underneath on the underside (106c and 106d of FIG. 2). The outer ring 102 is shown with an angle scale 110 marked in degrees which may be used for various angle measurements and settings. The outer ring 102 comprises a partial or complete circular cross section tube. The tube is preferably transparent and contains a leveling indicator 118 (also referred to as a gravity indicator) freely traveling within the tube. In one embodiment, the leveling indicator 118 may be a spherical object freely rolling within the tube to indicate the lowest point and may be read against the angle scale 110 or hour scale 108a. The leveling indicator may be any spherical object of sufficient durability including but not limited to glass, plastic, metal (aluminum, stainless steel), and in keeping with the bracelet embodiment, may be pearl, silver, or a gemstone. In an alternative embodiment, the tube may be filled with a liquid leaving a bubble or floating sphere as the level indicator—in which case the indication would be at the top rather than the bottom of the ring. The liquid may include but is not limited to water, alcohol, or antifreeze.

Figure 2:
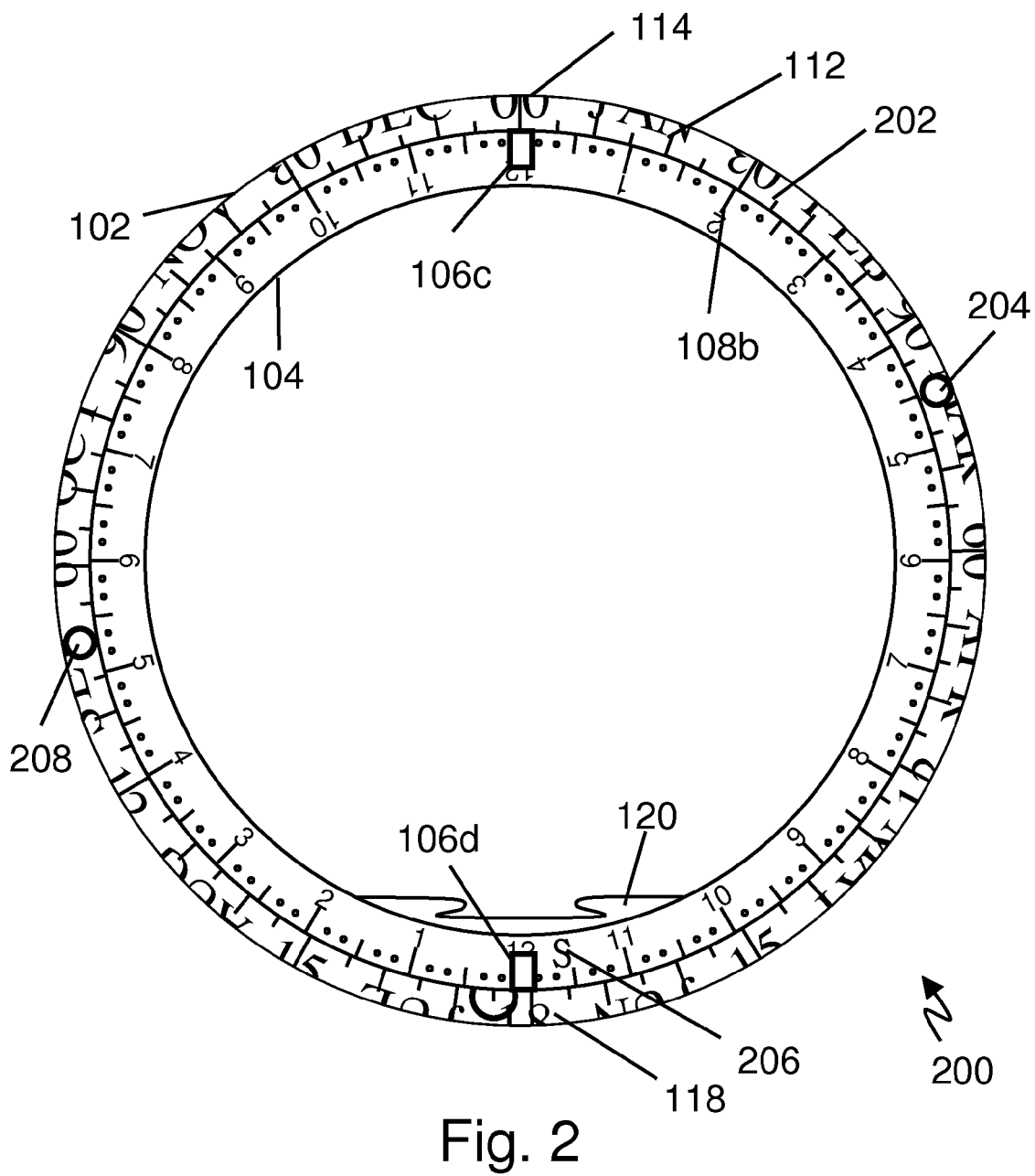
FIG. 2 illustrates a bottom view of an exemplary sundial in accordance with the present invention, showing the south face with an hour scale on the inner ring and a calendar scale on the outer ring.

The outer ring 102 may be any transparent or translucent material sufficiently transparent to observe the level indicator 118 within. Clear plastic tubing is preferred for durability. The outer rim of the outer ring includes numerical angle values 114 for each 30 degrees on the angle scale. The numerical angle values 114 are positioned right side up as viewed from above the topside 100 center of the ring, viewing across the angle scale 110. Also shown are month label markings 112 for a month scale on the opposite side (FIG. 2). The month markings 112 are interleaved with the angle markings 110 and are upside-down as viewed on the topside 100 because they are to be viewed with reference to the month scale on the bottom side (FIG. 2).

The inner ring 104 comprises a half circle cross section annular ring that slidably rotates relative to the outer ring 102. The inner ring 104 has a time scale 108a showing 24 hours in the 360 degrees of the ring. The time scale 108a is marked in hours with ten-minute dots and 30-minute marks between each hour. Two 12-hour periods are shown. Alternatively a single 24-hour period could be used. The inner ring 104 includes two gnomons 106a and 106b on the topside 100, one at each 12-hour mark, and two additional gnomons on the bottom side (see FIG. 2). The gnomons are used as indicators in various measurements that may be made with the device. Each gnomon is preferably a short half circle cross section as sharp features are preferably avoided to prevent injury to a wearer of the bracelet embodiment. The half circle diameter and thus the width of the gnomon 106a and 106b at the base is preferably 2 mm for an exemplary bracelet embodiment. One to three millimeters diameter is desirable, with a height less than 4 millimeters being preferred for a bracelet. Other sizes and shapes may be used. The short and round gnomon shown is desirable for a bracelet embodiment because it will not easily catch on things and be damaged or cause damage. A non-bracelet embodiment may have less reason to prefer a small gnomon. The gnomon being on one side of the ring across the center (diameter) of the ring from the analemma, is twice as sensitive in indicating time as a gnomon located in the center of the ring and more sensitive than gnomons located above the ring, as may be provided in prior art sundials.

The inner ring 140 typically comprises an opaque material; however, the inner ring may be transparent if desired. The material may include plastic, metal, wood or other stable material. In one embodiment, the inner ring 140 may be silver or gold for greater decorative value and greater appeal as a bracelet.

The inner ring also includes a marking "N" 116 to identify the face as the North face 100 to be positioned toward the north when the device is used in the sundial configuration.

Figure 6:
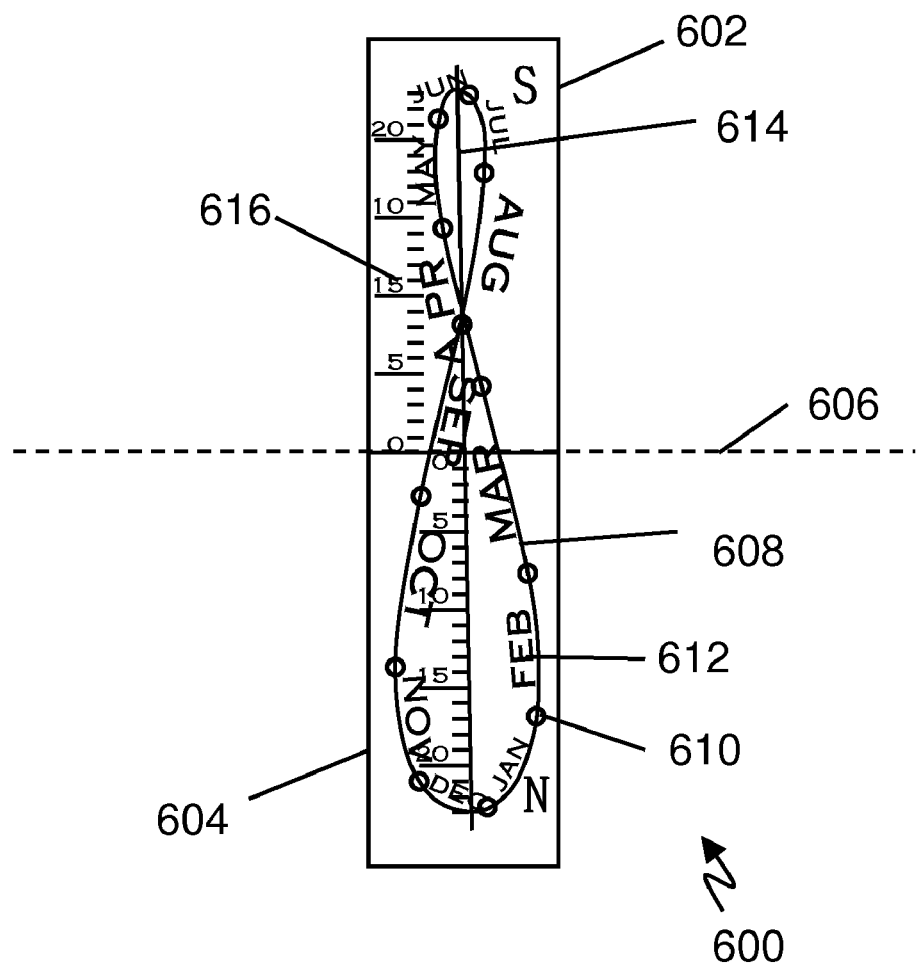
FIG. 6 shows an exemplary analemma ticket for use with the ring of FIG. 1 to form a sundial.

Also shown is an analemma ticket holder 120. The sundial configuration also comprises an analemma ticket as a separable component that may be carried separately and installed in the analemma holder when the device is used in the sundial configuration. The analemma ticket is a flat rectangular piece with an analemma pattern printed thereon for use in various measurements. The card is inserted into the analemma holder with the equator line flush with the north or south face of the sundial. The analemma holder 120 is provided with rounded points to avoid injuring someone wearing the ring as a bracelet. FIG. 6 and associated text.

The ring may be made any size as desired for the sundial. In one particular embodiment, the ring may also be worn as a bracelet. The ring may be made from materials desirable as jewelry to enhance the appeal of the device as a bracelet, thus encouraging the owner to take the device on trips around the world, during which the device can be used to better appreciate the context of the earth's relationship to the sun and stars and the basis of our timekeeping. In one exemplary bracelet embodiment, the inside diameter may be 67 mm. Typical bracelets are in the range from 63 mm to 76 mm inside diameter. Smaller diameters may be made for children. Larger diameters may be made for specialty purposes, but may have less mass market appeal.

Figure 3:
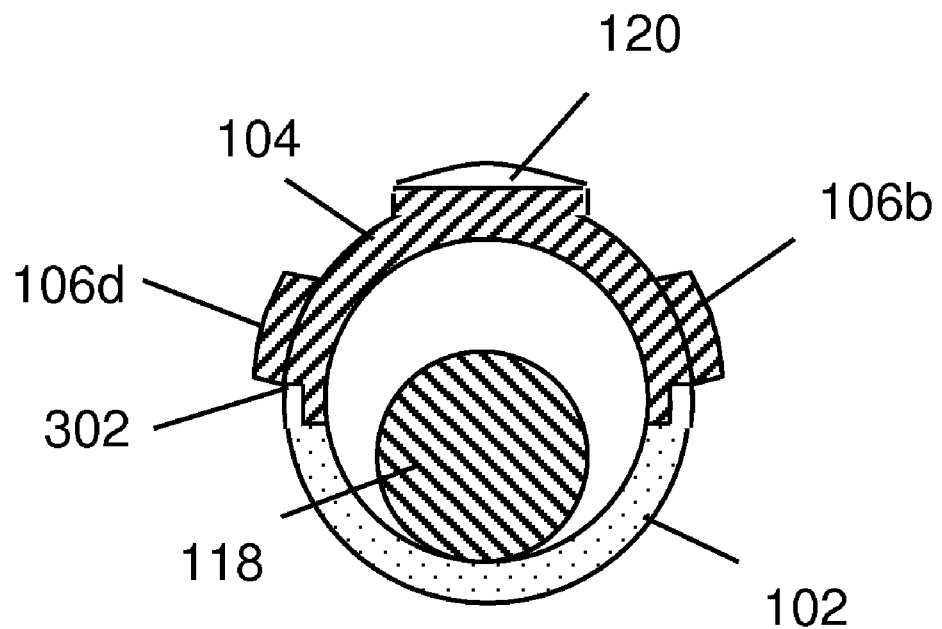
FIG. 3 illustrates a cross section through an exemplary sundial in accordance with the present invention.
Figure 4:
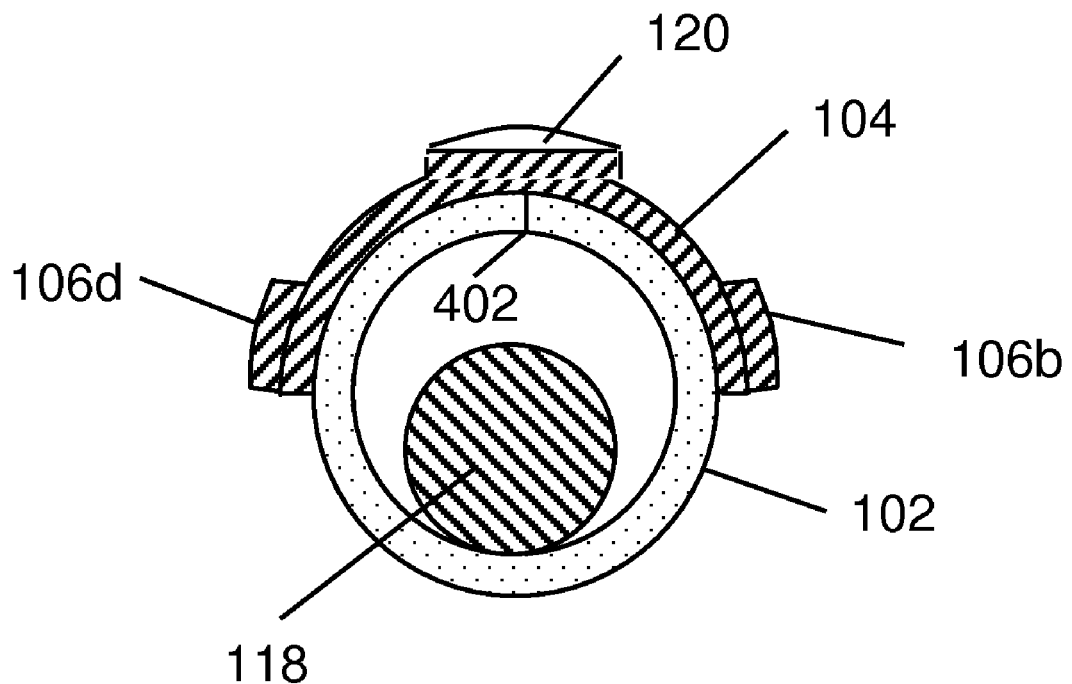
FIG. 4 illustrates a cross section through an alternative exemplary sundial in accordance with the present invention.

Cross section 3 is shown in FIG. 3 with an alternative shown in FIG. 4.

FIG. 2 illustrates a bottom view of an exemplary sundial in accordance with the present invention, showing the south face with an hour scale on the inner ring and a calendar scale on the outer ring. Referring to FIG. 2, the inner ring 104 comprises a time scale 108b corresponding to the time scale 108a on the top side, i.e., each scale number is the same as the one directly opposite on the north face 100 (top side), i.e., as if seen directly through the ring 104. The south face 200 (bottom side) of the inner ring 104 also includes two gnomons 106c and 106d at the 12 hour positions directly opposite the corresponding gnomons 106a and 106b on the north face 100.

The south face 200 also includes a calendar scale 202 on the outer ring 102 instead of the angle scale shown on the north face. The calendar scale 102 has major ticks at the first of each month, intermediate ticks at ten day intervals and small ticks at five day intervals between the ten day intervals. The day intervals are measured from the beginning of each month and restart at the beginning of each month. As an additional (alternative) indication of the day of the month, the text 112 indicating the month may be a three character abbreviation of the month and is placed with the center of each character at the 10, 15, and 20 day points from the beginning of the month. Alternative meaningful intervals include the 7, 14, and 21 day points. The text 112 is oriented to be read right side up from a viewpoint over the center of the south face 200. The month name text 112 shown in FIG. 2 is printed on the rim of the tubular outer ring 102 so that only the bottom half of the characters are visible in the view.

FIG. 2 also shows two dots 204 and 208 on the month scale 202, not indicating time, but indicating angle to a particular star, for use in nighttime measurements. One dot 204 is positioned at about March 8 and represents the angle of the star Dubhe, the pointer star on the lip of the bowl in the Big Dipper, Ursa Major. The other dot 208 is at about September 20 and represents the angle to Caph in Cassiopeia, which may be used if Dubhe is below the horizon. Dot 204 may be one color and dot 208 may be another color to distinguish them, for example blue and red respectively. The dots 204 and 208 may be luminescent or may include white, or otherwise made to be visible at night. The use of these dots will be described later. Southern hemisphere stars may also be included, for example Beta Carina and Alpha Triangulum Australis. Other stars may be chosen as desired.

The south face also includes a marking "S" 206 indicating the south face. The south face faces toward the south for sundial time measurements.

FIG. 3 illustrates a cross section through an exemplary sundial in accordance with the present invention. Referring to FIG. 3, the inner ring 104 and outer ring 102 each comprise a half shell that, when joined, forms a complete tubular ring. The inner shell 104 and outer shell 102 may slide to allow independent rotation about the ring center along an interlocking junction 302. The inner ring 104 is typically opaque, preferably an ivory colored plastic. Other materials may be used. The outer ring is sufficiently transparent to view the gravity indicating ball 118 in the tubular structure. The gravity indicating ball 118 is preferably a white ball for clear viewing at night. Other colors may be used. The ball materials include white plastic, glass, silver, pearl or any other stable, solid, round material. Pearl may enhance the sundial's appeal as a bracelet. In a bracelet embodiment, an exemplary gravity indicating ball may be 3.5 mm in diameter, but any convenient size may be used. Also shown are the gnomons 106b and 106d attached at the 12 hour mark near the analemma holder 120. A cross section through the analemma holder 120 shows the flat back surface and holder arms.

FIG. 4 illustrates a cross section through an alternative exemplary sundial in accordance with the present invention. Referring to FIG. 4, the inner ring 104 comprises an annular half shell riding on a tubular ring forming the outer ring 102. The gravity indicator 118 rides within the outer ring tube 102. In one embodiment, the outer ring 102 may have a continuous cross section. In another embodiment, the outer ring may have a split 402 on the inside rim, as shown in FIG. 4. If the plastic forming the outer ring 102 is sufficiently flexible, the tube may be opened at the split 402 to insert the gravity indicator 118. Heat may be applied to improve flexibility.

In an alternative embodiment, the tube 102 of FIG. 4 (sealed, without the split 402) may be filled with liquid and the gravity indicator 118 may be lighter than the liquid, such as a hollow ball, or light plastic; or the gravity indicator 118 may be a bubble in the liquid. The lighter than liquid indicator will indicate at the top of the ring rather than at the bottom and the appropriate angle measurements are adjusted for the difference, as will be described later.

In one embodiment, the concave surface of the inside of the inner ring (between the inner ring and the outer ring) may have an inscription of any sort because the inner ring may be read through the transparent outer ring. In particular, the surface may contain an alphanumeric map of the world, i.e., a list of city codes and associated latitude and longitude values for each city. An exemplary map inscription may include the following cities and associated lat-long values:

Line 1:

DUB 53N 6W AZO 39N 27W PAR 49W 2E ROM 42N 12E MOS 56N 38E MEC 21N 40E CPT 34S 18E MAN 15N 121E

Line 2:

LON 51N 0W GIB 36N 5W AMS 52N 5E OSL 60N 42E CRO 30N 31E BOM 19N 73E BKK 14N 101E TKO 36N 140E

Line 3:

LIS 38N 9W MAD 40N 4W BER 53N 13W ATN 38N 24E JER 32N 35E BAG 33N 44E SGP 1N 104E SGH 31N 121E

Line 4:

SYD 34S 151E STK 57N 135W LAX 34N 118W MIA 26N 80W NYC 48N 74W STG 33S 71W BAR 13N 60W

Line 5

AKL 37S 175E SEA 48N 122W DEN 40N 105W VRC 19N 96W PMC 9N 80W BNA 35S 58W BRM 33N 65W

Line 6

HAW 21N 132W TAH 18S 150W NOR 30N 90W TEG 14N 87W QTO 0N 77W RIO 23S 43W PTR 18N 66W

This inscription space may also be used for a table of cosine values and associated degrees, which may be used for some measurements which may be made with the device. Also, the cosine table may be used to find distance between cities on the map by noting that at the equator, one degree longitude is about 100 kilometers (more precisely 111 km). Higher latitudes are reduced by the cosine of the latitude. The cosine value table may be inscribed as follows:

```
/1  /98 /94 /87 /77 /64 /50 /34 /17 /0  COS
0   10  20  30  40  50  60  70  80  90  DEG
```

If additional space is needed, the inside of the inner ring may also be used for inscriptions. In particular, the inventor finds the following inscription in keeping with the spirit of finding guidance from the heavens:

TRUST IN THE LORD WITH ALL YOUR HEART AND DO NOT RELY ON YOUR OWN UNDERSTANDING THINK ABOUT HIM IN ALL YOUR WAYS AND HE WILL GUIDE YOU ON THE RIGHT PATHS.

Figure 5:
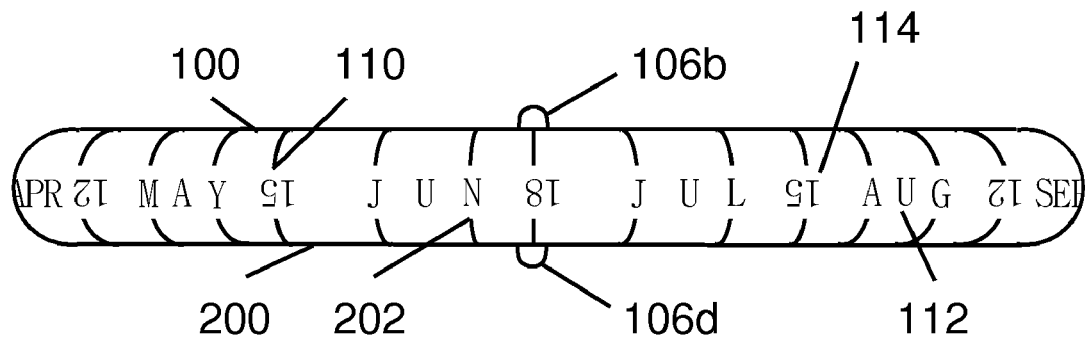
FIG. 5 shows a side view of the sundial of FIG. 1 and FIG. 2.

FIG. 5 shows a side view of the sundial of FIG. 1 and FIG. 2. FIG. 5 shows the tubular ring 102 with the angle markings 114 for the angle scale 110 on the north face 100, (top side) and the month labels 112 for the calendar scale 202 on the south face 200 (bottom side). Two gnomons 106b and 106d are seen, one on the north face 100 and another on the south face 200.

FIG. 6 shows an exemplary analemma ticket for use with the ring of FIG. 1 to form a sundial. The analemma ticket 600 of FIG. 6 comprises a base material on which an analemma pattern 608 is printed. A time scale is efficiently displayed along the analemma. The time scale comprises twelve points 610 that indicate the beginning of each month together with the three letter abbreviation 612 for each month. The three letters 612 provide the dual function of indicating the month and serving as day markers within the month. Each of the three letters indicates a span of about one third of the month, i.e. ten days. Thus each letter may be centered on an associated ten day span. Also, each letter may be stretched to span each ten day span. Thus, the letters may provide scale resolution in addition to indicating the month.

The analemma ticket 600 also includes a declination scale 616 for finding the earth's declination according to the calendar scale 610, 612 on the analemma 608. To find declination, one finds the calendar date point on the analemma for the current date and then reads across to the declination scale 616 to find the earth's declination at that calendar date. Also included on the ticket is a centerline 614 (also referred to as the mean solar noon line 614) for use in latitude measurements.

In accordance with one embodiment of the present invention, the analemma ticket 602 may be folded or cut at the equator line 606, or each half 602, 604 may be printed on opposite sides of a single ticket 600. Each side of the ticket would be used during the associated time interval shown on the ticket, i.e., a first half ticket, labeled "S," would include north declinations from the spring to the fall equinox, and a second half ticket, labeled "N," would include south declinations from the fall to the spring equinox. The first half ticket is labeled "S" because the analemma shadows for northern declinations fall lower on the ticket. Thus the "S" ticket is mounted extending below the "S" face of the ring, and conversely for the second "N" half of the ticket.

The analemma ticket is placed in the analemma holder and positioned so that the equatorial line is flush with the north face or south face of the sundial ring. The face selected depends on the ticket chosen. See FIG. 7. The analemma ticket may be made of a durable plastic, metal, paper or other sheet material. The ticket may be carried independently of the ring, e.g., the ticket may be carried with credit cards in a wallet or handbag. Alternatively, the ticket may be attached by a decorative chain to the ring, allowing the ring to be worn as a bracelet without the interference of the analemma ticket as would be encountered with the ticket permanently installed in the ring for use as a sundial. In one exemplary embodiment, the analemma ticket may be 13 mm wide and 32 mm long, from one end to the equator line 606. The size of the analemma ticket 600 is primarily determined by the distance from the gnomon 106a to the analemma ticket 600, since the analemma itself is defined by angles that are fixed by the earth's declination and orbit. Thus if the sundial is scaled to a different ring size, the analemma would also be scaled proportionately.

The dual (split) analemma works with the dual gnomons on the north and south face to permit a more compact assembled package by allowing the analemma to occupy interior space in the ring and thus protrude outside the ring by a smaller amount than would otherwise be the case. Thus, the assembled size is reduced by at least two characteristics: first, the analemma is divided in half, and second, the half is positioned to utilize interior ring space. Since the two halves are not used simultaneously, each half may separately occupy the same interior space, reducing the total length occupied by the analemma by the width of the ring. The dividing in half of the analemma has the further advantage of increasing the strength and durability of the analemma ticket by reducing the tendency to bend or flex the ticket.

Figure 7:
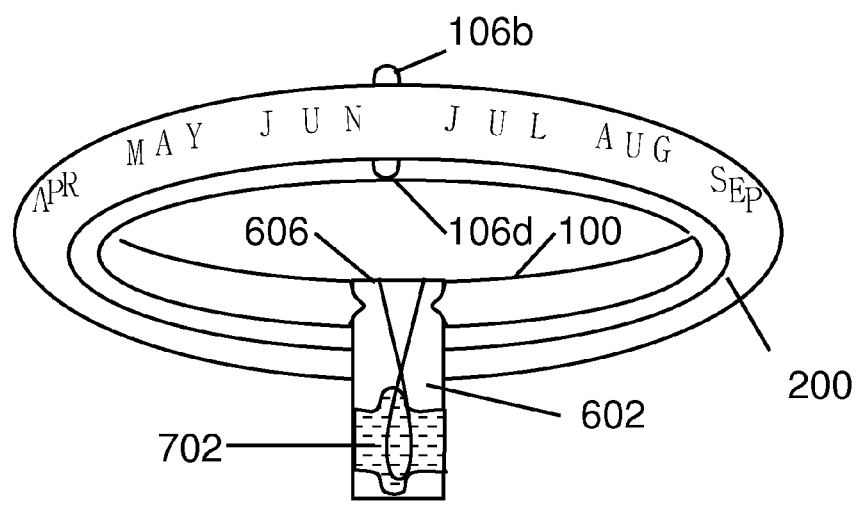
FIG. 7 shows the sundial configured to measure solar time.

FIG. 7 shows the sundial configured to measure solar time. Referring to FIG. 7, northern declination (summer in northern hemisphere) side 602 of the analemma ticket is installed in the analemma holder 120 with the equatorial line 606 flush with the north face 100 of the sundial. Note that in the summer (in the northern hemisphere) when the sun moves north to higher declinations, the shadow will move lower. Thus the analemma ticket 602 extends downward from the ring past the south face 200 of the ring. The shadow 702 of the north face gnomon 106b is positioned at today's date on the analemma with the gnomon 602b center providing vertical alignment and the north face 100 of the ring providing horizontal alignment to the analemma.

Note that the operational device with the analemma ticket installed has a thickness parallel to the ring axis which is less than the full height of the analemma pattern shown in FIG. 6. The thickness being maximum at the analemma ticket, where the thickness is only slightly greater than half of the full analemma pattern, i.e., the length of one analemma ticket plus the height of one gnomon. Thus, the use of the analemma ticket with half of the full analemma pattern reduces at least one size envelope dimension for the device, in particular, the overall thickness (perpendicular to the plane of the ring). The thickness is further reduced by placing the equatorial line of the half analemma even with one face of the ring and extending the half analemma through the interior of the ring.

Figures 8A, 8B:
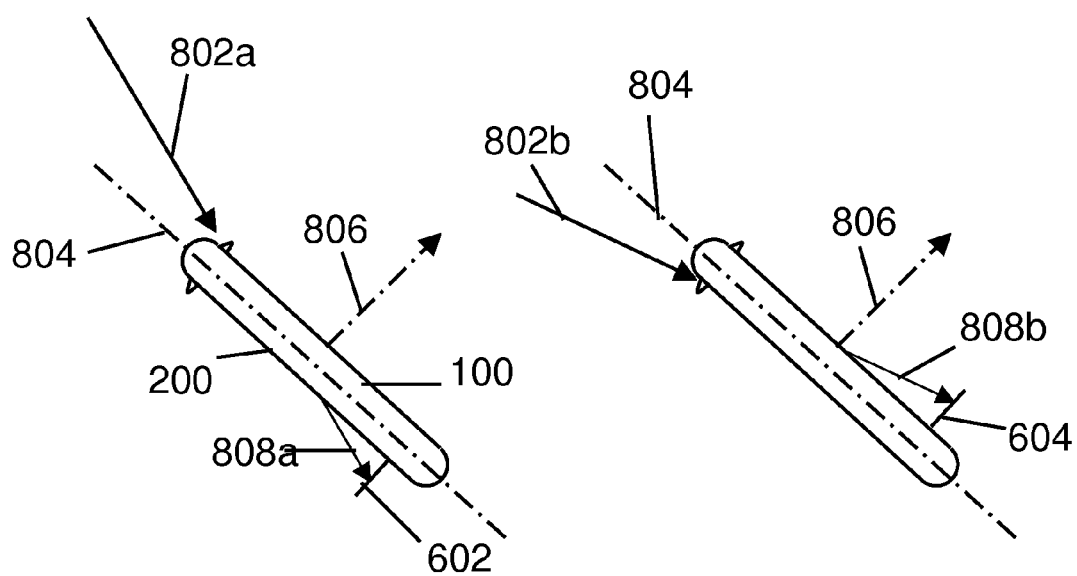
FIG. 8A and FIG. 8B show summer and winter alignments, respectively, for measuring solar time.

FIG. 8A and FIG. 8B show summer and winter alignments, respectively, for measuring solar time.

Referring to FIG. 8A, the sundial ring is shown with the analemma ticket extending below the south face 200 of the ring. The ring is aligned with the plane of the ring 804 parallel to the plane of the earth's equator and the axis of the ring 806 parallel to the earth's rotation axis. In the summer (northern hemisphere), the sun's rays 802a come from above the equatorial plane, producing a shadow 808a of the north face gnomon 106a that shines through the center of the ring to the analemma ticket 602 below.

Referring to FIG. 8B, the sundial ring is shown with the analemma ticket extending above the north face 100 of the ring. The ring is aligned with the plane of the ring 804 parallel to the plane of the earth's equator and the axis of the ring 806 parallel to the earth's rotation axis. In the winter (northern hemisphere), the sun's rays 802b come from below the equatorial plane, producing a shadow 808b of the south face gnomon 106c that shines through the center of the ring to the analemma ticket 604 above.

Using the Celestial Navigation Bracelet

If one were to possess a water filled glass globe with a map of the earth and lines of latitude and longitude marked on the globe, and if one were to orient the globe's axis parallel to the earth's axis and its face towards the sun in the same way the earth is oriented, then a small bubble in that globe would indicate one's exact position on the earth no matter where one travels on earth. The celestial navigation device can utilize this principle for making measurements, yet is compact, rugged, and free of protrusions so that the device may be carried in a pocket or worn as a bracelet on the wrist.

To Determine Mean Sun Time

From the northern hemisphere face south and hold the instrument in front of you with the rotation axis in a vertical north-south plane. Place the analemma in the analemma holder with the face containing today's date towards the center of the bracelet. The equatorial line 606 of the analemma 600 should be flush with the edge 100 or 200 of the instrument. Now, while maintaining the instrument's rotation axis 806 in the vertical north south plane, tilt the top of the instrument toward or away from you until the shadow of the gnomon 106a or 106c located on the same side as the equatorial line falls on today's date on the analemma. (i.e., use the gnomon 106a or 106c corresponding to the analemma side 602 or 604 being used) The instrument may be rotated about the axis and the axis may be tilted up or down to achieve the gnomon shadow alignment, but the axis must remain in the north-south vertical plane. Once the gnomon shadow is aligned with the analemma at today's date, the bubble indicator 118 of the bubble embodiment will indicate the sun time on the time scale. The pearl indicator 118 of the pearl embodiment will be 180 degrees on the angle scale or 12 hours on the hour scale from the correct sun time.

To Determine Latitude

To determine latitude by day, the instrument is held vertically in a north-south plane to observe the angle of the sun at noon. The north face, having the angle scale is used for the measurement. First, insert the analemma ticket in the ticket holder and rotate the inner ring relative to the outer ring so that the north face 100 gnomon 106a (opposite the analemma holder 120) is at the angle of the sun's declination for the calendar day as read from the angle scale 110. The sun's declination may be read from the analemma ticket 600 by finding the present calendar day on the analemma pattern 608 and then reading across to the declination scale 616 to find the sun's declination. Next, hold the instrument so that the plane of the ring is in a north-south vertical orientation. Rotate the instrument on its axis until the shadow of the gnomon 106a aligns with the mean solar noon line 614 of the analemma ticket. In a version with a floating ball or bubble indicator 118, the indicator 118 will float to the top and will now indicate the latitude on the angle scale 110. In an instrument with a heavy indicator, the indicator will find the lowest point, and the latitude will be 180 degrees from the indictor 118 location read from the angle scale 110, or 12 hours around on the hour scale 108a.

The geometry is easier to visualize if one considers the measurement taking place at the equator. When setup, the zero degree mark on the scale would be vertical and the gnomon 106a would be aligned with the sun, the mean solar noon line 614 and the sun's declination on the angle scale 110. Southern declinations would be used in winter and northern declinations for summer.

To find latitude at night, the two north face 100 gnomons 106a and 106b are used to sight the North Star. The analemma ticket 600 is removed for this measurement. Place the gnomons 106a and 106b at the 90 degree marks on the angle scale 110. Hold the instrument so that the ring is in a vertical north-south plane. Initially, place the zero degree mark up for the floating indicator and down for the heavy indicator. Rotate the instrument while keeping the inner and outer rings fixed relative to one another to align the two gnomons 106a and 106b with the North Star, i.e., sight from one gnomon over the top of the other gnomon to the North Star. The indicator 118 will now indicate the latitude as the angle scale value 110 at the indicator 118, e.g., bubble or pearl.

Since the North Star is about ¾ degree from true north in the direction of the little dipper, a slight correction in latitude may be made by observing the angle and direction of this offset. The cosine table inscribed on the device or provided with the device may be consulted to refine the correction.

To Determine Longitude

To determine longitude by day, the sundial is configured for time and used to find longitude. Set the zero degree mark on the angle scale 110 to align with the present time at zero longitude (Greenwich Mean Time, or Universal Time), preferably not standard time, but solar time at zero longitude.

From the northern hemisphere face south and hold the instrument in front of you with the rotation axis in a vertical north-south plane. Place the analemma in the analemma holder with the face containing today's date towards the center of the bracelet. The equatorial line 606 of the analemma 600 should be flush with the edge 100 or 200 of the instrument. Now, while maintaining the instrument's rotation axis 806 in the vertical north south plane, tilt the top of the instrument toward or away from you until the shadow of the gnomon 106a or 106c located on the same side as the equatorial line falls on today's date on the analemma. (i.e., use the gnomon 106a or 106c corresponding to the analemma side 602 or 604 being used) The instrument may be rotated about the axis and the axis may be tilted up or down to achieve the gnomon shadow alignment, but the axis must remain in the north-south plane. Once the gnomon shadow is aligned with the analemma at today's date, the bubble indicator 118 of the bubble embodiment will indicate the longitude. The pearl indicator 118 of the pearl embodiment will be 180 degrees on the angle scale or 12 hours on the hour scale from the correct longitude.

To find longitude at night, place the noon gnomon 106c of the south face 200 at today's date on the calendar scale 202. Hold the instrument like a picture frame in front of you while facing north. Center the North Star in the middle of the instrument and rotate the instrument, while keeping the inner ring and outer ring fixed relative to one another, until the blue dot at March 3 on the calendar scale is on an imaginary line between the North Star and Dubhe. Dubhe is the star on the lip of the big dipper (Ursa Major). The bubble or pearl will indicate solar time. Now set the zero degree mark to Greenwich Mean Time and read the longitude at the solar time just determined.

Since the North Star is about ¾ degree from true north in the direction of the little dipper, a slight correction in latitude may be made by observing the angle and direction of this offset. The cosine table inscribed on the device or provided with the device may be consulted to refine the correction.

Time Conversion Between Different Time Zones

As an additional benefit to travelers, or those communicating internationally, the device can also be used to quickly determine the time in another time zone. Travelers often need to call home and wish to call at a convenient time both at the travel location and the home location. The time at home can be found by setting the time scale equal to the current time at the angle scale value equal to the present longitude. The time at home can be read as the time at the home longitude.

Variations

Note that in one configuration having only sundial functionality, the device may comprise a single ring with one gnomon, the 24 hour time scale, and the analemma ticket. Such configuration may be observed in FIG. 1 and FIG. 2 by fixedly attaching the inner and outer rings together. In another configuration, the angle scale may be added to the single ring configuration. In still another variation, two gnomons 106a and 106c may be used with the single ring and the analemma ticket may be shortened to half size, each half being used with one of the respective gnomon 106a or 106c. These and other subcombinatons of the full device may be found useful in accordance with the teachings herein.

One of ordinary skill in the art may vary the design based on the teachings herein. Such variations include but are not limited to interchanging the inner and outer ring functions, repositioning the scales, alternate scale labels, variations in diameter or thickness, different color schemes, and different materials used for constructing the invention.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A celestial navigation device comprising:
   a ring comprising a transparent annular tubular structure having a gravity indicating device moving freely within said transparent annular tubular structure to indicate the highest or lowest point in said transparent annular tubular structure; said ring having a rotational axis perpendicular to a plane of said ring;
   a first gnomon attached to said ring;
   an analemma pattern attached to said ring across a diameter of said ring from said first gnomon;
   a time scale imprinted around said ring;
   wherein said ring is oriented with a rotational axis in a north-south plane and said ring is adjusted by tilting the rotational axis within said north-south plane and said ring is further adjusted by rotating said ring around said rotational axis to place a shadow of said first gnomon on said analemma pattern at a point on said analemma pattern corresponding to a current calendar date; whereupon achieving said placement of said shadow, a current sun time is indicated by said gravity indicating device with reference to said time scale.

2. The celestial navigation device of claim 1, wherein the gravity indicating device comprises a spherical indicator freely rolling within said transparent annular tubular structure for indicating the lowest point in said transparent annular tubular structure.

3. The celestial navigation device of claim 1, further including a fluid occupying an interior space within said transparent annular tubular structure; wherein the gravity indicating device comprises a floating sphere or a bubble within said fluid occupying said interior space of said transparent annular tubular structure for indicating said highest point in said transparent annular tubular structure.

4. The celestial navigation device of claim 1, wherein said analemma pattern is removable and removing of said analemma pattern reduces an envelope dimension of said celestial navigation device.

5. The celestial navigation device of claim 4, wherein the analemma pattern comprises a portion of a full analemma pattern to utilize only a northern half of the full analemma pattern or a southern half of the full analemma pattern at a given time.

6. The celestial navigation device of claim 5, further including an analemma ticket having the northern half of the analemma pattern on a first side and the southern half of the analemma pattern on a second side.

7. The celestial navigation device of claim 5, further including a second gnomon at the same radial position around said ring as said first gnomon, said second gnomon on an opposite side of said ring from said first gnomon; wherein said first gnomon is used with said northern half analemma pattern and said second gnomon is used with said southern half of the analemma pattern to determine sun time.

8. The celestial navigation device of claim 1, wherein the center of the ring is empty for permitting the ring to be worn as a bracelet.

9. A celestial navigation device comprising:
   a first ring;
   a first gnomon attached to said first ring;
   an analemma pattern attached to said first ring across a diameter of said first ring from said first gnomon;
   a time scale imprinted around said first ring;
   a second ring comprising a transparent annular tubular structure having a gravity indicating device moving freely within said transparent annular tubular structure to indicate the highest or lowest point in said transparent annular tubular structure; said first ring and said second ring in sliding contact and independently rotatable around a common rotation axis;
   wherein celestial navigation device is oriented with the rotational axis in a north-south plane and said celestial navigation device is adjusted by tilting the rotational axis within said north-south plane and further adjusted by rotating said first ring to place a shadow of said first gnomon on said analemma pattern at a point on said analemma pattern corresponding to a current calendar date; whereupon achieving said placement of said shadow, the current sun time is read as indicated by said gravity indicating device with reference to said time scale.

10. The celestial navigation device of claim 9, wherein the gravity indicating device comprises a spherical indicator freely rolling within said transparent annular tubular structure for indicating the lowest point in said transparent annular tubular structure.

11. The celestial navigation device of claim 9, further including a fluid occupying an interior space within said transparent annular tubular structure; wherein the gravity indicating device comprises a floating sphere or a bubble within said fluid occupying said interior space of said transparent annular tubular structure for indicating said highest point in said transparent annular tubular structure.

12. The celestial navigation device of claim 9, wherein said analemma pattern is removable and removing of said analemma pattern reduces an envelope dimension of said celestial navigation device.

13. The celestial navigation device of claim 12, wherein the analemma pattern comprises a portion of a full analemma pattern to utilize only a northern half of the full analemma pattern or a southern half of the full analemma pattern at a given time.

14. The celestial navigation device of claim 13, further including a first analemma half ticket having the northern half of said full analemma pattern printed thereon and a second analemma half ticket having the southern half of said full analemma pattern printed thereon; wherein one of said first analemma half ticket or said second analemma half ticket is installed on said ring.

15. The celestial navigation device of claim 13, further including a second gnomon at the same radial position around said ring as said first gnomon, said second gnomon on an opposite side of said ring from said first gnomon; wherein said first gnomon is used with said northern half analemma pattern and said second gnomon is used with said southern half of the analemma pattern to determine sun time.

16. The celestial navigation device of claim 9, wherein the center of the ring is empty for permitting the ring to be worn as a bracelet.

17. The celestial navigation device of claim 9, further including an angle scale on said second ring; wherein latitude is measured by setting the first gnomon to the sun's declination for the current day on the angle scale; positioning the celestial navigation device with the rotation axis horizontal and the plane of the device in a north south orientation at noon local sun time; rotating the device so that the shadow from the gnomon falls on the mean solar noon line on the analemma card; and reading latitude according to the position of the gravity indicator relative to the angle scale.

18. The celestial navigation device of claim 9, further including a point marked on the ring for determining time at night, said point related to the right ascension angle of a given star, and further including a calendar scale on said second ring representing a full year in the 360 degrees of the ring; wherein time is determined by aligning the axis of the instrument to point to the North Star and positioning the instrument to observe the North Star through the center of the instrument; the first gnomon is set to the current date on the date scale; the instrument is aligned so that the point marked is on an imaginary line between the North Star and the given star; whereupon alignment is achieved, the gravity indicator indicates current local sun time relative to said time scale.

19. The celestial navigation device of claim 18, wherein the point marked is near March 3 on said calendar scale and the given star is Dubhe.

20. The celestial navigation device of claim 9, wherein the analemma pattern further includes a plurality of month abbreviations having an associated month, each month abbreviation comprising a plurality of letters, each said month abbreviation indicating a region of said analemma pattern associated with each respective month abbreviation; and wherein the letters of said plurality of letters of at least one said month abbreviation further indicate time divisions within the associated month.

* * * * *